United States Patent [19]
Roan, III

[11] 4,451,494
[45] May 29, 1984

[54] SODIUM-FREE SALT SUBSTITUTE

[76] Inventor: Charles F. Roan, III, Rte. 1, Box 722, Lake Geneva, Wis. 53147

[21] Appl. No.: 416,631

[22] Filed: Sep. 10, 1982

[51] Int. Cl.³ ............................................. A23L 1/237
[52] U.S. Cl. .................................................... 426/649
[58] Field of Search ......................................... 426/649

[56] References Cited

U.S. PATENT DOCUMENTS 4,243,691 1/1981 Mohlenkamp et al. ............. 426/649
4,297,375 10/1981 Shackelford .................... 426/649 X

FOREIGN PATENT DOCUMENTS 312088 5/1930 United Kingdom ................ 426/649

Primary Examiner—Joseph M. Golian
Attorney, Agent, or Firm—Scott J. Meyer; Eric P. Schellin

[57] ABSTRACT

A substantially sodium-free salt substitute composition which comprises: (a) from about 0.1% to about 2% by weight of hydrolyzed collagenous animal protein having an average molecular weight of from about 500 to about 5000, an amino nitrogen content of from about 1% to about 2% and a total nitrogen content of from about 15% to about 17%, and (b) from about 98% to about 99.9% by weight of potassium chloride.

10 Claims, No Drawings

SODIUM-FREE SALT SUBSTITUTE

BACKGROUND OF THE INVENTION

This invention relates to a flavor-enhancing composition which is suitable as a substantially sodium-free salt substitute.

In recent years much attention has been given to the desireability of reducing the dietary intake of sodium. Although sodium chloride is a natural component of many food products, it is widely used as a supplement in processed foods for flavor and preservative effects and as a condiment in cooking and eating of prepared foods.

Efforts have been made to restrict sodium in the diet by various means for medical reasons. One such approach is the provision of so-called salt substitutes or reduced sodium-containing salt compositions. Most of these compositions employ potassium chloride as a base salt but require numerous other components to mask the bitterness which the potassium salt imparts to the taste. Consumers generally prefer the flavor characteristics which are associated with the natural saltiness of sodium chloride.

Examples of the multi-component salt substitutes are those described in U.S. Pat. Nos. 2,742,366; 3,505,082; 3,514,296; 3,782,974; 3,860,732; 4,066,799; 4,068,006; 4,243,691; and 4,340,614. Typical components in these compositions in addition to the potassium chloride are various non-sodium salts such as the potassium, ammonium or calcium phosphates, tartrates, fumarates, citrates, gluconates, glutamates, ascorbates, adipates, inosinates, guanylates and the corresponding acids as well as sugars such as dextrose, lactose and glucose, and other components such as the amino acid mixtures of hydrolyzed proteins described in U.S. Pat. No. 4,243,691.

DESCRIPTION OF THE INVENTION

In accordance with the present invention, a novel flavor-enhancing composition is provided which is suitable as a substantially sodium-free salt substitute but which is not dependent upon a multitude of diverse masking components. This novel composition comprises: (a) from about 0.1% to about 2% by weight of hydrolyzed collagenous animal protein having an average molecular weight of from about 500 to about 5000, an amino nitrogen content of from about 1% to about 2% and a total nitrogen content of from about 15% to about 17%, and (b) from about 98% to about 99.9% by weight of potassium chloride.

Although it has been suggested heretofore that amino acid mixtures from hydrolyzed proteins in amount of from 10% to 40% by weight are useful in admixture with sundry other components in sodium-free salt substitute compositions, unexpected advantages have been discovered in accordance with the present invention in use of a small amount of a particular type of hydrolyzed protein. It has been surprisingly found that hydrolyzed collaganous animal protein as defined herein when in admixture with potassium chloride in the stated proportions provides a variety of foodstuffs with a desirable salty flavor which resembles that which is obtained with common table salt (sodium chloride). By way of comparison, other hydrolyzed animal proteins such as those derived from casein or gelatin, or those having an excessive amount of free amino acids or having an exceedingly high average molecular weight, in similar admixture with potassium chloride tend to impart off-tastes and undesireable flavor overtones to the foodstuffs.

This desirable advantage of the hydrolyzed collagenous animal protein is exhibited with a relatively small amount of the material, namely from about 0.1% to about 2% and preferably about 0.5% by weight in combination with a complement of potassium chloride, when used on foodstuffs as a condiment in the customary amounts otherwise applied with common table salt. The advantage is obtained without the need to further include a variety of masking agents such as employed in other salt substitutes such as other non-sodium salts or their acids, various sugars and the like. Nevertheless, other such components can be added without detracting from the desirable properties of the two essential components defined herein provided that they are non-toxic and otherwise suitable for use in foodstuffs.

Minor amounts of materials such as non-caking agents, for example silicates, and trace minerals, for example iodides, can be added to the composition of this invention for their ordinary use in packaged solid salt type products.

A preferred hydrolyzed collagenous animal protein for use in this invention is a commercially available material sold under the trademark Primatone® CL Hydrolyzed Protein (Sheffield Products, Memphis, Tenn.). This material has been used heretofore in personal care products, such a shampoos, hair and skin conditioners, creams and lotions, but is not known to have been previously suggested for use in a substantially sodium-free salt substitute composition for application to prepared foodstuffs as disclosed herein. This preferred material is an enzymatically hydrolyzed collagenous animal protein having a molecular weight of about 1000, an amino nitrogen content of about 1–1.5% and a total nitrogen content of about 15.5–16.5%.

Another commercially available hydrolyzed collagenous animal protein material, Polypro®5000 (mol. wt. about 5000), while imparting a characteristic flavor to foodstuffs when in combination with potassium chloride, is less acceptable than the preferred lower molecular weight Primatone CL Hydrolyzed Protein. Accordingly, a molecular weight average of from about 500 to about 2500 is preferred. Molecular weight can be determined as number average molecular weight by conventional methods known to those skilled in the art.

The raw material source of collagenous animal protein can be animal hide or gut such as, for example, cowhide, calfhide, moosehide, pigskin, sheepskin, goatskin and the like high collagen sources. Particularly desirable enzymes for enzymatically hydrolyzing the collagenous animal protein are pancreatic enzymes such as trypsin, chymotrypsin and the like. Methods of hydrolysis of collagenous animal protein with these and other such enzymes are well known in the art.

The hydrolyzed collagenous protein as defined herein is to be distinguished from gelatin which is obtained by the partial hydrolysis of collagen. Most commercial gelatins contain molecular species between 15,000 to above 250,000 with the average between 50,000–70,000 mol. wt. See Kirk-Othmer, "Encyclopedia of Chemical Technology," Third Edition, Vol. 11, (1980), pages 711–719, John Wiley & Sons, New York. Likewise, the hydrolyzed collagenous animal protein as defined herein is to be distinguished from hydrolyzed vegetable or animal protein in which the hydrolysis has been carried out such as to provide an excessive amount of free amino acids as evident by the low molecular weight average of such free amino acids.

The following examples will further illustrate the invention although it will be understood that the invention is not limited to those specific illustrative examples.

EXAMPLE 1

A suitable substantially sodium-free salt substitute was prepared by admixing the following granular components:

| Component | % By Weight |
|---|---|
| Potassium chloride | 99.5 |
| Hydrolyzed collagenous animal protein (Primatone CL)* | 0.5 |
| Total | 100.0 |

*Available from Sheffield Products, Memphis, Tenn

When added to cooked sweet corn on the cob, broiled fish and baked chicken by sprinkling in small amounts (like a pinch of common table salt), the above composition produced a desirable salty flavor resembling that imparted by the addition of common table salt to these foodstuffs in the same amounts.

The following other similarly tested food grade hydrolyzed animal protein products admixed with potassium chloride in the same proportions as above were unacceptable due to the appreciable off-flavors and undesirable flavor overtones:

(a) Acid hydrolyzed casein protein (Hy-Case ® SF; mol. wt. about 150; amino nitrogen content about 10%; total nitrogen content about 13%); and (b) enzymatically hydrolyzed gelatin protein (Primatone ® G; amino nitrogen content about 2.5%; total nitrogen content about 16%).

EXAMPLE 2

The composition of Example 1 with the hydrolyzed collagenous animal protein component was further tested by application to cooked green beans by an expert food technologist and was reported to be an excellent sodium-free salt substitute from the standpoint of overall flavor.

EXAMPLE 3

The composition of Example 1 with the hydrolyzed collagenous animal protein component was tested by a panel of three individuals on cooked sweet corn on the cob, broiled fish and baked chicken. These foodstuffs were prepared without the exogenous addition of sodium chloride. Control tests for comparison were made on the same foods with two well-known commercially available salt substitutes, namely Morton ® Salt Substitute and Morton Lite Salt ®. The former is label marked with U.S. Pat. No. 3,505,082, and is reported to contain potassium chloride, fumaric acid, tricalcium phosphate, monocalcium phosphate and less than 10 mg sodium per 100 g of product (that is, one teaspoon contains a maximum of 0.5 mg of sodium). The latter is label marked with U.S. Pat. Nos. 3,036,746; 3,529,754; and Re. 27,981, and is reported to contain sodium chloride, potassium chloride, calcium silicate, magnesium carbonate, dextrose and potassium iodide. 100 grams of the latter product is reported to contain 19,480 mg sodium and 25,975 mg potassium (that is, each ½ teaspoon contains 550 mg sodium and 733 mg potassium). It was the unanimous conclusion of this panel of individuals that the composition of Example 1 which contained the hydrolyzed collagenous animal protein component was more acceptable in overall flavor, including less bitter or metallic aftertaste, than either of the tested commercially available products.

EXAMPLE 4

The composition of Example 1 with the hydrolyzed collagenous animal protein component was tested by a different panel of two individuals on freshly sliced tomatoes and judged to be excellent and preferable in flavor when compared in similar tests with the two commercially available products described in Example 3, above, and another commercially available salt substitute sold under the trademark "NoSalt" (Norcliff Thayer, Inc.). The latter product is reported to contain potassium chloride, potassium bitartrate, potassium glutamate, adipic acid, fumaric acid, polyethylene glycol 400 and disodium inosinate.

Various other examples will be apparent to the person skilled in the art after reading this disclosure without departing from the spirit and scope of the invention and it is intended that all such examples are included within the scope of the appended claims.

What is claimed is:

1. An edible, substantially sodium-free salt substitute composition which comprises: (a) from about 0.1% to about 2% by weight of hydrolyzed collagenous animal protein having an average molecular weight of from about 500 to about 5000, an amino nitrogen content of from about 1% to about 2% and a total nitrogen content of from about 15% to about 17%, and (b) from about 98% to about 99.9% by weight of potassium chloride.

2. The composition of claim 1 in which the hydrolyzed collagenous animal protein component is about 0.5% by weight and the potassium chloride component is about 99.5% by weight.

3. The composition of claim 1 in which the hydrolyzed collagenous animal protein component has an average molecular weight of from about 500 to about 2500.

4. The composition of claim 1 in which the hydrolyzed collagenous animal protein is obtained by the enzymatic hydrolysis of collagenous animal protein.

5. The composition of claim 1 in which the hydrolyzed collagenous animal protein has an amino nitrogen content of from about 1% to about 1.5% and a total nitrogen content of from about 15.5% to about 16.5%.

6. The composition of claim 1 in which the hydrolyzed collagenous animal protein has an average molecular weight of about 1000.

7. The Composition of claim 5 in which the hydrolyzed collagenous animal protein has an average molecular weight of about 1000.

8. The Composition of claim 7 in which the hydrolyzed collagenous animal protein is obtained by the enzymatic hydrolysis of collagenous animal protein.

9. A foodstuff containing a flavor-enhancing amount of the composition of claim 8.

10. A method of enhancing the flavor of a foodstuff which comprises the step of adding a flavor-enhancing amount of the composition of claim 8 to the foodstuff.

* * * * *